United States Patent [19]
Fujii et al.

[11] Patent Number: 5,904,756
[45] Date of Patent: May 18, 1999

[54] MIST RECOVERING METHOD AND APPARATUS

[75] Inventors: Sadao Fujii, Funabashi; Hideki Ito, Tokyo-To; Takashi Takata, Kawaguchi; Toshihiro Umeoka, Takatsuki; Masahiko Kiyota, Kakogawa; Masahiro Murai, Kashiba, all of Japan

[73] Assignees: Kawasaki Jukogyo Kabushiki Kaisha, Kobe; The Kansai Electric Power Co., Inc., Osaka, both of Japan

[21] Appl. No.: 08/909,844

[22] Filed: Aug. 12, 1997

[30] Foreign Application Priority Data

Aug. 20, 1996 [JP] Japan .................................. 8-237228

[51] Int. Cl.$^6$ .................................................. B01D 46/02
[52] U.S. Cl. .............................. 96/188; 55/413; 55/414; 55/456; 55/457; 55/523; 55/526; 55/DIG. 25
[58] Field of Search ............................. 55/269, 348, 456, 55/457, 413, 414, 523, 526, DIG. 25; 96/188

[56] References Cited

U.S. PATENT DOCUMENTS

| | | | |
|---|---|---|---|
| 1,829,401 | 10/1931 | Kamrath | 55/519 |
| 3,853,504 | 12/1974 | Buscher et al. . | |
| 3,950,152 | 4/1976 | Guon . | |
| 4,050,638 | 9/1977 | Ito et al. . | |
| 4,086,070 | 4/1978 | Argo et al. | 55/DIG. 25 |
| 4,243,486 | 1/1981 | Neumann et al. . | |
| 4,257,791 | 3/1981 | Wald | 55/473 |
| 4,451,962 | 6/1984 | Cornelsen et al. | 55/526 |
| 4,483,698 | 11/1984 | Kuchenthal et al. | 55/413 |
| 4,759,782 | 7/1988 | Miller et al. . | |
| 5,030,258 | 7/1991 | Kisaragi et al. | 55/269 |
| 5,035,730 | 7/1991 | Kisaragi et al. | 55/269 |
| 5,415,676 | 5/1995 | Tokar et al. . | |
| 5,423,977 | 6/1995 | Aoki et al. | 210/107 |

FOREIGN PATENT DOCUMENTS

| | | | |
|---|---|---|---|
| 571108 | 2/1959 | Canada | 55/523 |
| 0 755 709 A1 | 1/1997 | European Pat. Off. . | |
| 24 52 386 A1 | 5/1975 | Germany . | |
| 25 41 383 A1 | 3/1977 | Germany . | |
| 3024324A1 | 1/1982 | Germany | 55/523 |
| 31 45 320 A1 | 5/1983 | Germany . | |
| 43-7114 | 3/1968 | Japan | 55/523 |
| 0179062 | 11/1982 | Japan | 55/523 |
| 01004813 | 1/1986 | Japan | 55/523 |
| B2-8-8968 | 1/1996 | Japan . | |
| 960 640 | 6/1964 | United Kingdom . | |
| 1 082 810 | 9/1967 | United Kingdom . | |

*Primary Examiner*—Jay H. Woo
*Assistant Examiner*—Minh-Chau T. Pham
*Attorney, Agent, or Firm*—Oliff & Berridge, PLC

[57] ABSTRACT

In a mist recovering apparatus for recovering a mist contained in a gas, provided with a filter having pores of pore size increasing from a gas inlet side toward a gas outlet side, the gas containing the mist is passed from the gas inlet side of the filter, through the filter toward the gas outlet side of the filter. The mist is trapped by the filter and grows into droplets as the gas containing the mist flows through the filter, and the droplets drip down along the gas outlet surface of the filter and are collected under the filter.

8 Claims, 11 Drawing Sheets

MIST RECOVERING METHOD AND APPARATUS

BACKGROUND OF THE INVENTION

1. Field of the Invention

The present invention relates to a mist recovering method and a mist recovering apparatus for recovering a mist contained in a gas, suitable for recovering, for example, sodium from an inert gas, such as argon gas, containing sodium vapor and flowing at a high flow rate through a dry cleaning apparatus having a cleaning tank in which the inert gas is blown against a spent nuclear fuel used in a sodium-cooled fast breeder to remove sodium adhering to the spent nuclear fuel.

2. Description of the Related Art

Sodium contained in a gas in a sodium mist has been recovered by either a method which solidifies sodium from a sodium mist and collects solidified sodium by a filter for recovery or a method which changes a sodium mist into sodium droplets and collects the droplets for recovery.

When recovering sodium by the former conventional method, the filter needs to be changed occasionally because solid sodium deposits on the filter and, eventually, clogs up the filter. When recovering sodium by the latter conventional method, the filter is not clogged up in a short time because sodium is collected in sodium droplets. However, the method needs another recovering apparatus below the filter because the sodium droplets are scattered again in a sodium mist from the filter. Thus, these conventional methods are unable to recover the sodium mist efficiently and require troublesome maintenance work.

A metal mist trapping method which recovers sodium in sodium droplets from a sodium mist contained in a cover gas system is disclosed in JP-B No. 8-8968 published Jan. 31, 1996. This metal mist trapping method uses a metal mist trapping apparatus having a vessel having a vertical gas passage packed with horizontal metal wire nets stacked in layers. The upstream metal wire nets with respect to the flowing direction of a gas containing a sodium mist are formed of finer metal wires and have smaller meshes than the downstream metal wire nets. The metal wire nets are heated at a temperature not lower than the melting point of sodium by a heating unit during operation. Since the gas passage of the vessel is fully packed with the horizontal metal wire nets stacked in layers, the sodium mist is trapped mainly by the metal wire nets near the gas inlet of the vessel and liquid sodium layers held on those metal wire nets enhances the sodium mist trapping performance of the metal mist trapping apparatus if the gas containing the sodium mist flows through the gas passage at a relatively low flow rate.

However, if the gas containing the sodium mist flows through the gas passage at a high flow rate at which the gas flows when a dry cleaning apparatus is used, and the size of droplets produced by the condensation of the sodium mist is as small as several micrometers, liquid sodium layers held on the metal wire nets are blown off the metal wire nets and discharged through the gas outlet of the vessel, which reduces the sodium mist recovering efficiency of the metal mist trapping apparatus.

SUMMARY OF THE INVENTION

Accordingly, it is an object of the present invention to provide a mist recovering method to be applied to recovering a sodium mist by various sodium mist recovering apparatus including dry cleaning apparatuses and plants, capable of passing a gas satisfactorily through filters by avoiding the clogging of the filters, of preventing the rescattering of the sodium mist to omit any additional mist recovering apparatus and of efficiently recovering the mist at low costs.

Another object of the present invention is to provide a mist recovering apparatus for carrying out the foregoing mist recovering method of the present invention.

According to one aspect of the present invention, a mist recovering method comprises the steps of passing a gas containing a mist through a filter having a pore size gradually increasing from its gas inlet surface toward its gas outlet surface to separate the mist from the gas by trapping the mist by the filter as the gas flows through the filter, making a trapped mist grow into droplets in a portion having a larger pore size of the filter on the gas outlet side of the filter so that the droplets drip along the surface of the portion of the filter on the gas outlet side, and collecting the droplets under the filter.

According to another aspect of the present invention, a mist recovering apparatus for recovering a mist contained in a gas comprises a vertical vessel provided with a gas inlet at a lower portion thereof and with a gas outlet at an upper portion thereof, a filter disposed in a vertical position within the vertical vessel so that its lower end is at a level lower than that of the gas inlet of the vertical vessel, and having pore size increasing from a gas inlet side toward a gas outlet side, and a draining mechanism disposed at the lower end of the gas outlet side of the filter and having a drain pipe.

Preferably, the filter of the mist recovering apparatus for recovering a mist contained in a gas may be a filter structure constructed by laminating metal wire nets in a plurality of layers with the metal wire nets having finer meshes forming layers nearer to the gas inlet side and the metal wire nets having coarser meshes forming layers nearer to the gas outlet side and sintering the laminated metal wire nets, a filter structure constructed by forming layers of particles of a metal or a synthetic resin with the layers of the particles of smaller particle sizes formed nearer to the gas inlet side and the layers of the particles of greater particle sizes formed nearer to the gas outlet side or a ceramic filter structure having pores of pore size increasing from the gas inlet side toward the gas outlet side.

The filter of the mist recovering apparatus may have the shape of a circular tube, a flat plate, a corrugated plate, a hollow truncated cone or an inclined plate. The mist recovering apparatus may be provided with a single or a plurality of filters. A louver or a baffle may be disposed on the gas outlet side of the filter of the mist recovering apparatus.

The above and other objects, features and advantages of the present invention will become more apparent from the following description taken in connection with the accompanying drawings.

DETAILED DESCRIPTION OF THE PREFERRED EMBODIMENTS

Figure 1:
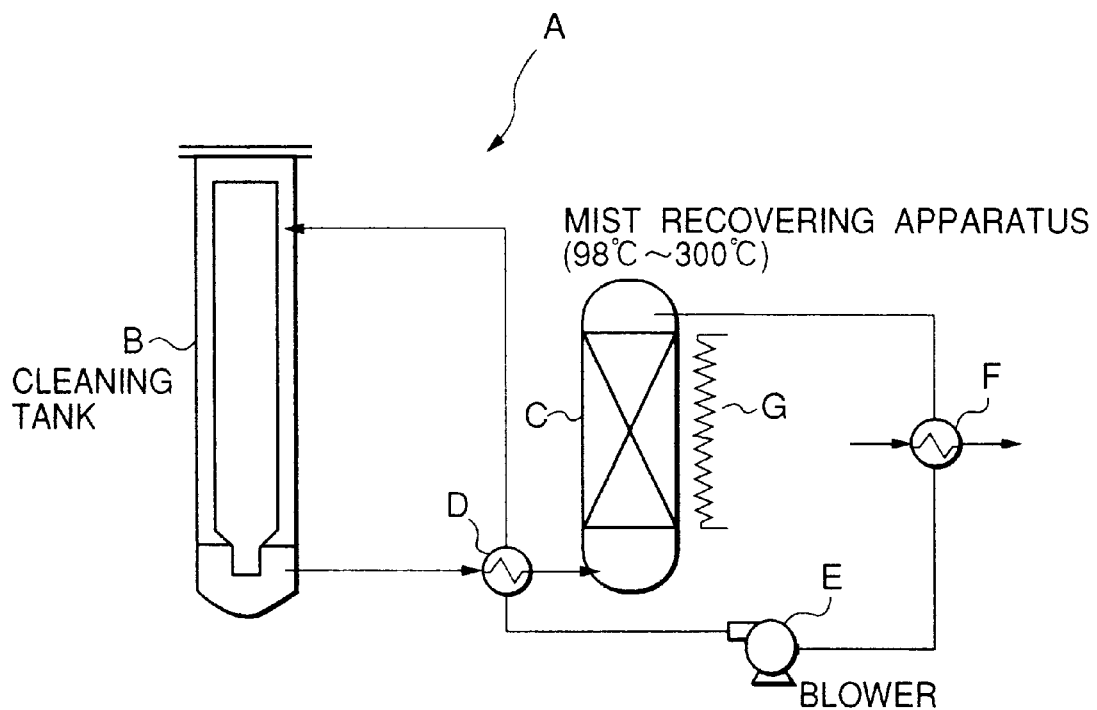
FIG. 1 is a diagrammatic view of a dry cleaning system for recovering a sodium mist, incorporating a mist recovering apparatus according to the present invention.

A mist recovering apparatus C in a preferred embodiment the present invention will be described with reference to FIG. 1 as applied to recovering a sodium mist from an inert gas, such as argon gas, containing sodium vapor and flowing at a high flow rate, in a dry cleaning system A which blows the inert gas against spent nuclear fuel used by a sodium-cooled fast breeder in a cleaning tank B to remove sodium adhering to the spent nuclear fuel. Shown also in FIG. 1 are an economizing heater D, a blower E, a cooling unit F, and a heating unit G coated with a heat insulating material and surrounding the mist recovering apparatus C.

Figure 2:
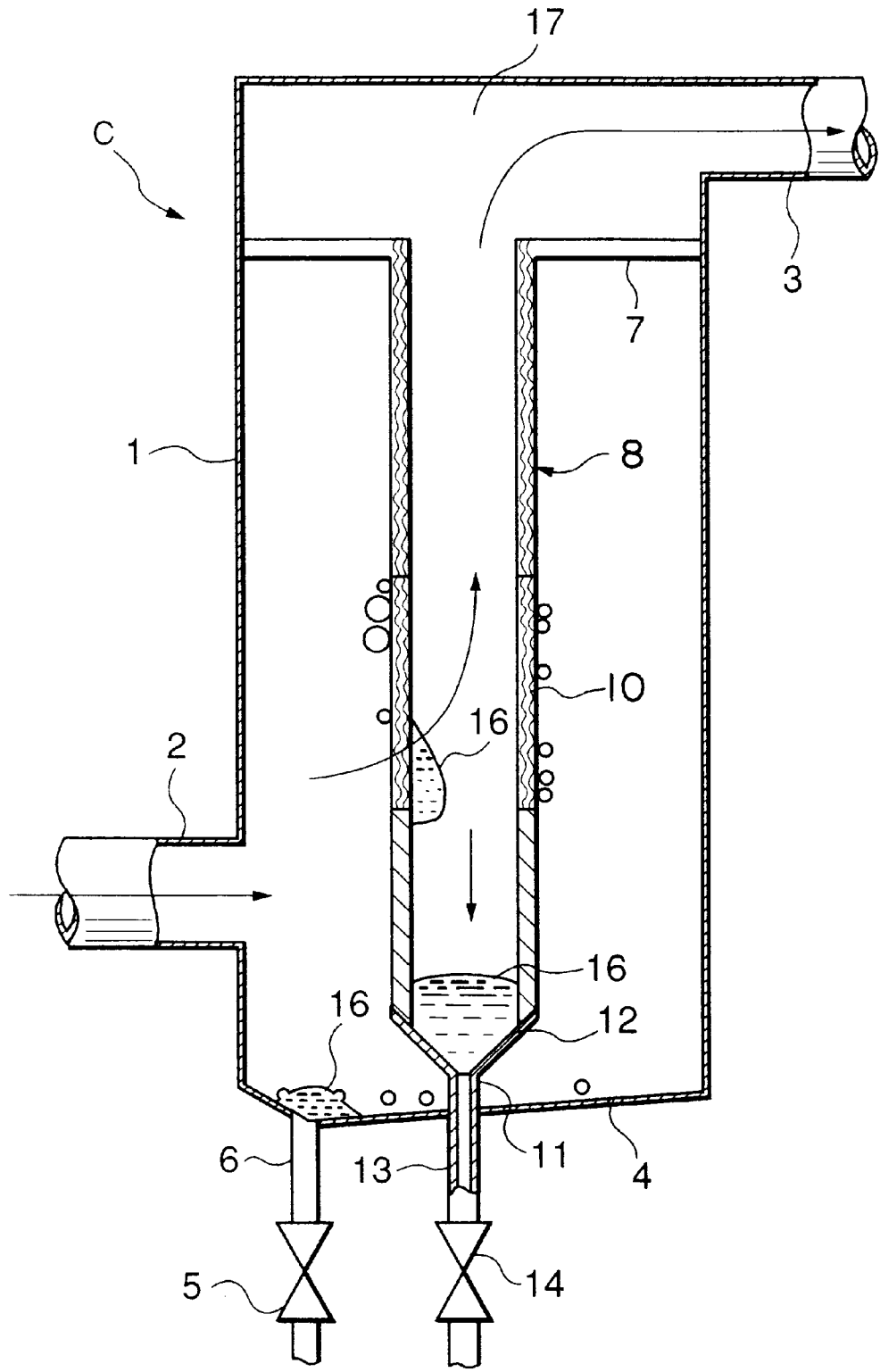
FIG. 2 is a schematic longitudinal sectional view of a mist recovering apparatus in a preferred embodiment of the present invention to be employed in the dry cleaning system of FIG. 1.

As shown in FIG. 2, the mist recovering apparatus C has a vertical vessel 1 having a side wall provided with a gas inlet 2 in its lower portion and with a gas outlet 3 at its upper end, and a unidirectionally inclined bottom wall 4, and a liquid sodium drain pipe 6 connected to a lowermost portion of the bottom wall 4 and provided with a valve 5. An inside tube 8 is coaxially provided with a flange 7 at its upper end and is supported in a vertical attitude in a central region of a chamber defined by the vertical vessel 1 with its lower end positioned on a level lower than that of the gas inlet 2 of the vertical vessel 1. A gas discharge chamber 17 is formed between the upper wall of the vertical vessel 1 and the flange 7. An intermediate and upper portion of the tube 8 is formed of a tubular filter 10.

Figure 3:
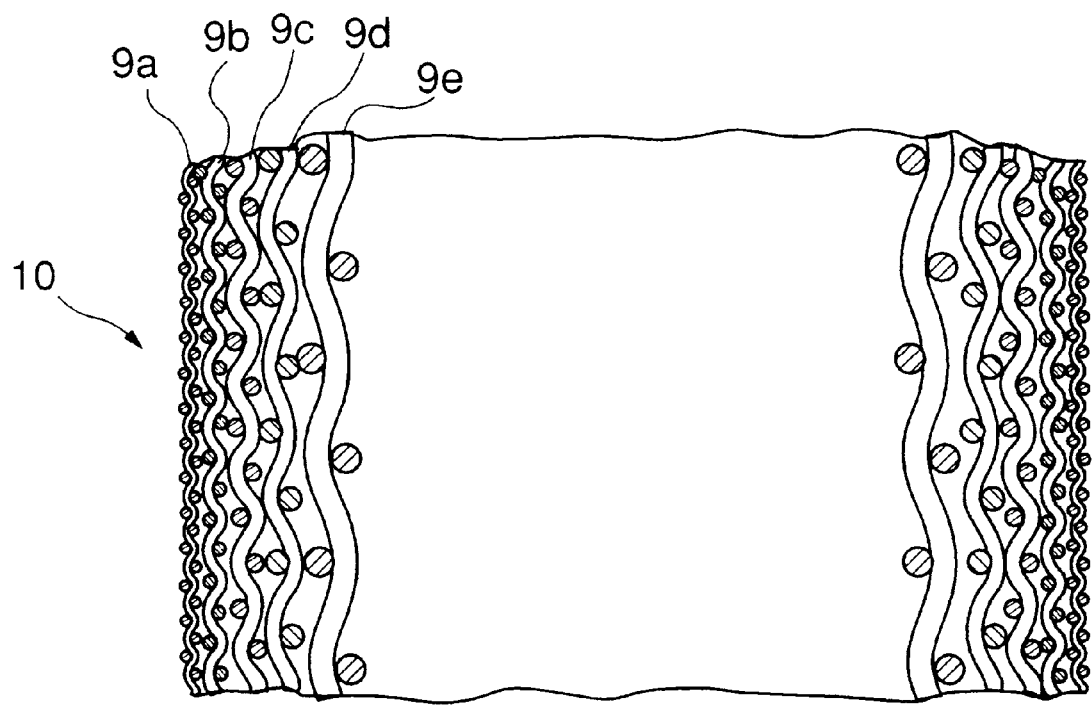
FIG. 3 is an enlarged, fragmentary, sectional view of a tubular filter included in the mist recovering apparatus of FIG. 2.

As shown in FIG. 3, the tubular filter 10 is formed by laminating five metal wire nets 9a to 9e and sintering the laminated metal wire nets 9a to 9e. The metal wire nets 9a to 9e are arranged such that any outer net has a finer mesh than any inner net as clearly shown in FIG. 3. A drain mechanism 11 is provided at the lower end of the tube 8. The drain mechanism 11 comprises a funnel 12 joined to the lower end of the tube 8, a drain pipe 13 connected to the outlet of the funnel 12 and extended through the bottom wall 4 of the vertical vessel 1, and a drain valve 14 connected to the drain pipe 13 outside the vertical vessel 1.

A sodium mist recovering method in accordance with the present invention, to be carried out by the mist recovering apparatus C will be described below. A gas containing a sodium mist is introduced through the gas inlet 2 formed in a lower portion of the side wall of the vertical vessel 1 into the vertical vessel 1. Then, the gas flows through the tubular filter 10 into the tube 8. The sodium mist contained in the gas is trapped and separated from the gas by the metal wire nets 9a to 9e of the tubular filter 10 as the gas flows through the tubular filter 10. The sodium mist trapped by the tubular filter 10 grows gradually into sodium droplets 16 as the trapped sodium mist is forced to move through the tubular filter 10 by the gas. The sodium droplets 16 drip down along the inner circumference of the tubular filter 10 into the funnel 12 joined to the lower end of the tube 8 and liquid sodium is collected temporarily in the funnel 12.

Then, the drain valve 14 is opened to discharge the liquid sodium collected in the funnel 12 through the drain pipe 13 for recovery. The gas which has released the sodium mist flows upward through the tube 8 into the gas discharge chamber 17 and is discharged from the vertical vessel 1 through the gas outlet 3. The sodium mist which has deposited on the outer circumference of the tube 8 and the inner circumference of the vertical vessel 1 grows into sodium droplets 16, and the sodium droplets 16 drip onto and are collected on the bottom wall 4. The valve 5 is opened to discharge the sodium droplets 16 collected on the bottom wall 4 through the liquid sodium drain pipe 6.

This sodium mist recovering method passes the gas containing the sodium mist through the tubular filter 10 formed by laminating the metal wire nets 9a to 9e, in which inner metal wire nets have coarser meshes than outer metal wire nets, whereby the sodium mist is trapped by the metal wire nets 9a to 9e and separated from the gas. The gas is able to flow smoothly through the tubular filter 10 without causing clogging because the mesh of the metal wire nets 9a to 9e becomes coarser as the gas flows inward, whereby the sodium mist trapped by the metal wire nets 9a to 9e is allowed to grow gradually into large sodium droplets 16 as the same is driven to move through the tubular filter 10 by the gas to the inner circumference of the tubular filter 10. Therefore, the sodium droplets 16 thus produced by the condensation of the sodium mist trapped by the tubular filter 10 are not scattered again into the gas outlet in a sodium mist. The large sodium droplets 16 drip by gravity along the inner circumference of the tubular filter 10 into the funnel 12 at the lower end of the tube 8. Since the sodium droplets 16 drip downward along the inner circumference of the tubular filter 10, while the gas flows upward through the tube 8, the rescattering of a sodium mist can effectively be prevented and the sodium droplets 16 can efficiently be recovered.

Figure 4:
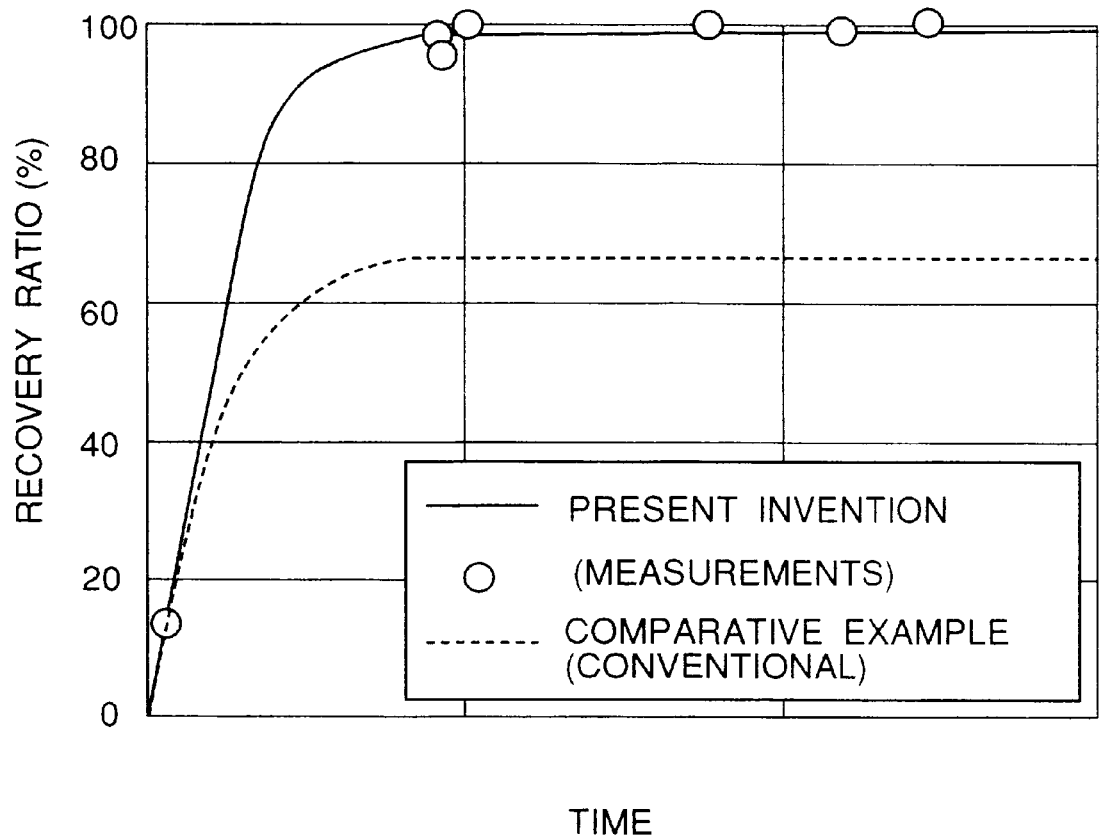
FIG. 4 is a graph comparatively showing the difference in mist recovering efficiency between a mist recovering method of the present invention and a conventional mist recovering method.

As is obvious from FIG. 4, the mist recovering efficiency of the sodium mist recovering method of the present invention is far higher than that of a conventional sodium mist recovering efficiency. While a maximum recovery achieved by the conventional sodium mist recovering method after a long period of operation is about 68%, a recovery achieved by the sodium mist recovering method of the present invention in a short period of operation is about 99%.

Figure 5:
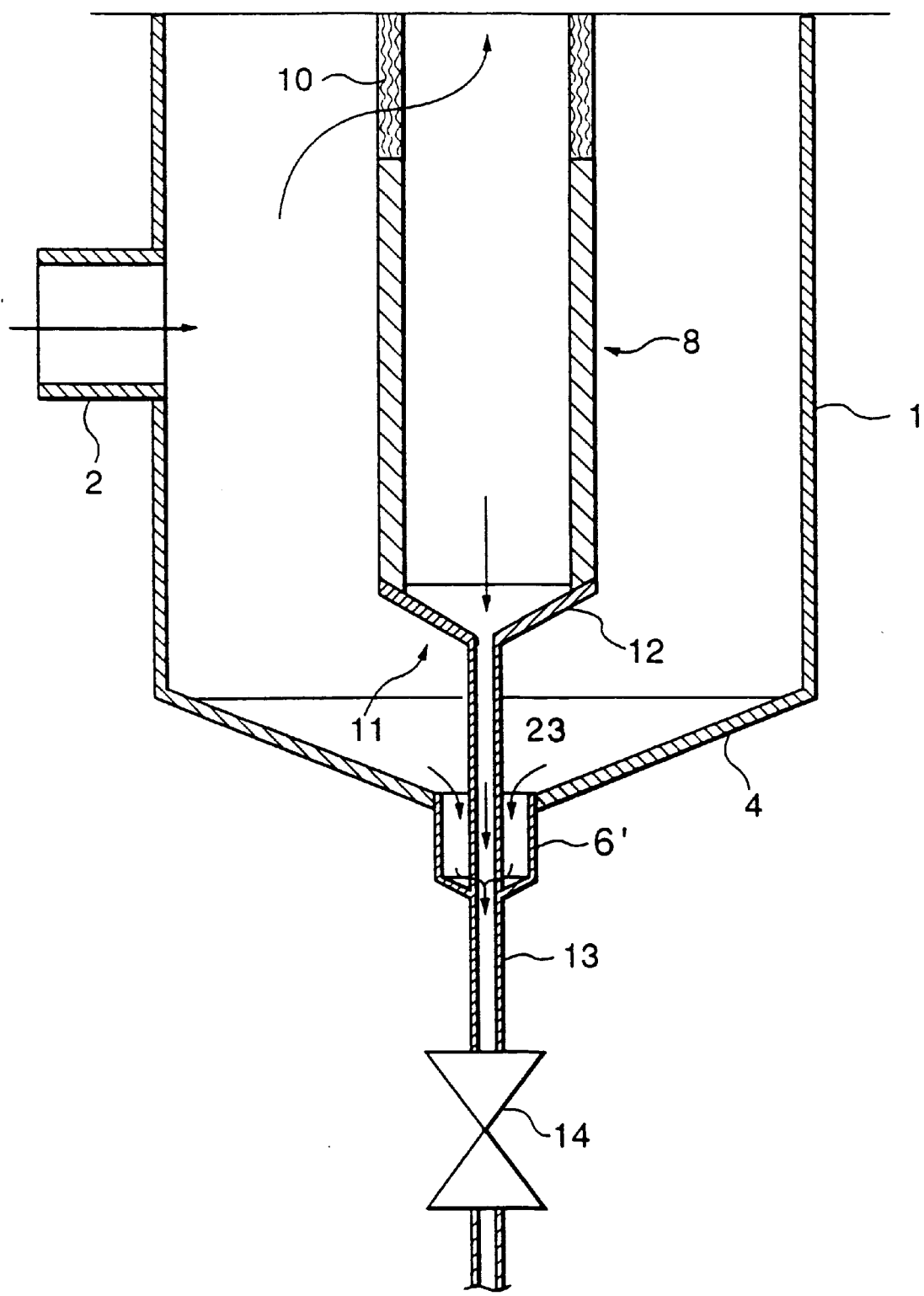
FIG. 5 is an enlarged sectional view of a modification of the mist recovering apparatus of FIG. 2.

FIG. 5 shows a lower portion of a vertical vessel 1 in a modification of the vertical vessel 1 included in the mist recovering apparatus C of FIG. 2. The vertical vessel 1 shown in FIG. 5 has a conically tapered bottom wall 4. A sodium drain pipe 61 of a relatively great diameter is joined to the lower end of the tapered bottom wall 4. A drain pipe 13 has an upper end joined to a funnel 12 joined to the lower end of a tube 8 and is extended through the drain pipe 6'. Sodium droplets 16 are collected in and drained through the drain pipe 13 as indicated by the arrows 23 in FIG. 5.

In the foregoing sodium mist recovering apparatus of the present invention, the sodium mist is trapped by the tubular filter 10 as the gas containing the sodium mist flows from the side of the outer circumference of the tubular filter 10 toward the side of the inner circumference of the tubular filter 10. However, the sodium mist recovering apparatus may be provided with a tubular filter formed by laminating metal wire nets 9a to 9e, in which the metal wire nets nearer to the inner circumference of the tubular filter among the metal wire nets 9a to 9e have finer meshes than those nearer to the outer circumference of the same, instead of the tubular filter 10 shown in FIG. 3, and the sodium mist may be trapped by the tubular filter as the gas containing the sodium mist flows from the side of the inner circumference of the tubular filter toward the side of the outer circumference of the same.

Figure 6:
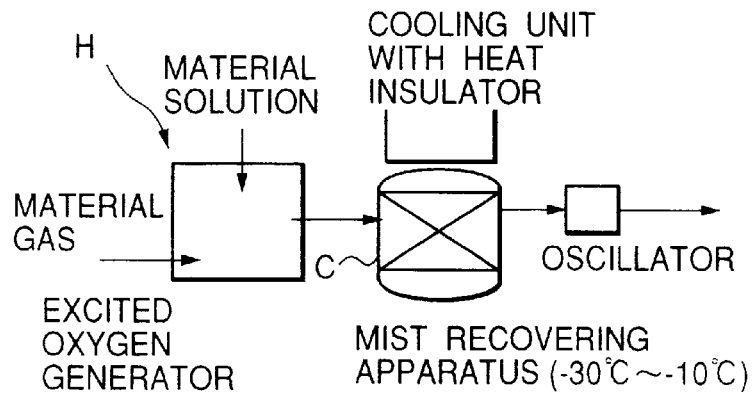
FIG. 6 is a block diagram of an iodine laser including a mist recovering apparatus of the present invention for recovering a mist.
Figure 7:
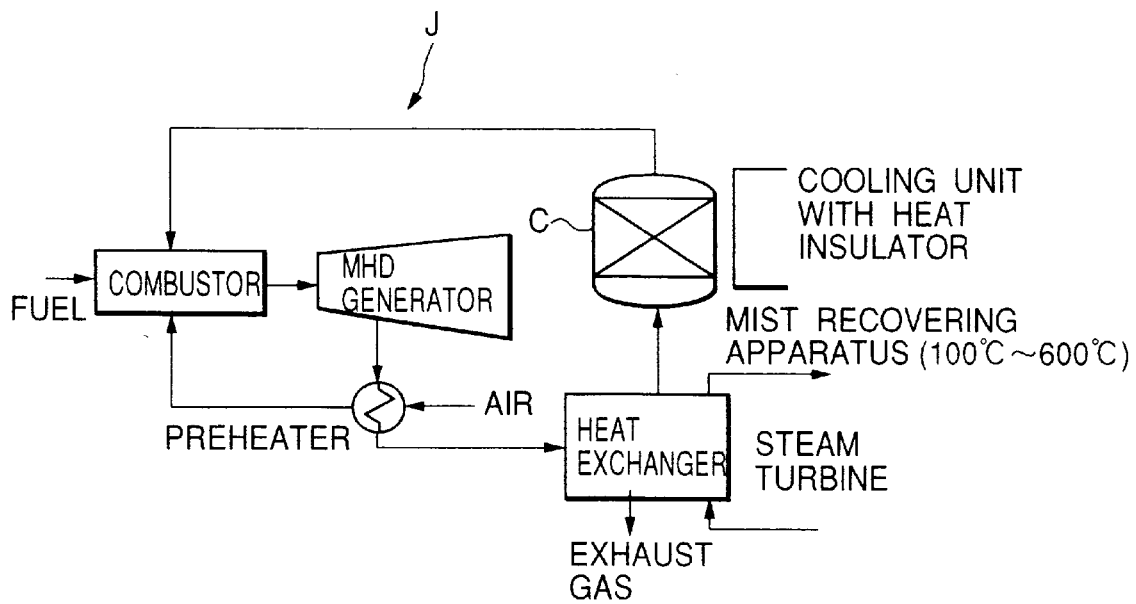
FIG. 7 is a block diagram of a MHD power generating system employing a mist recovering apparatus of the present invention for recovering a seed mist.
Figure 8:
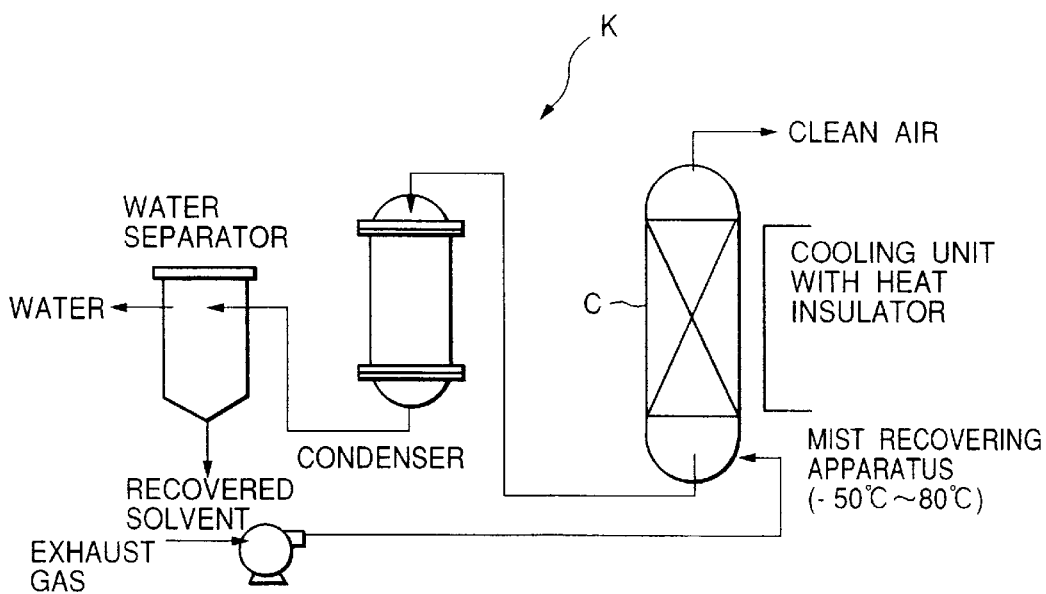
FIG. 8 is a block diagram of a gas recovering system for recovering Freon gas and organochlorine solvents, employing a mist recovering apparatus of the present invention.
Figure 9:
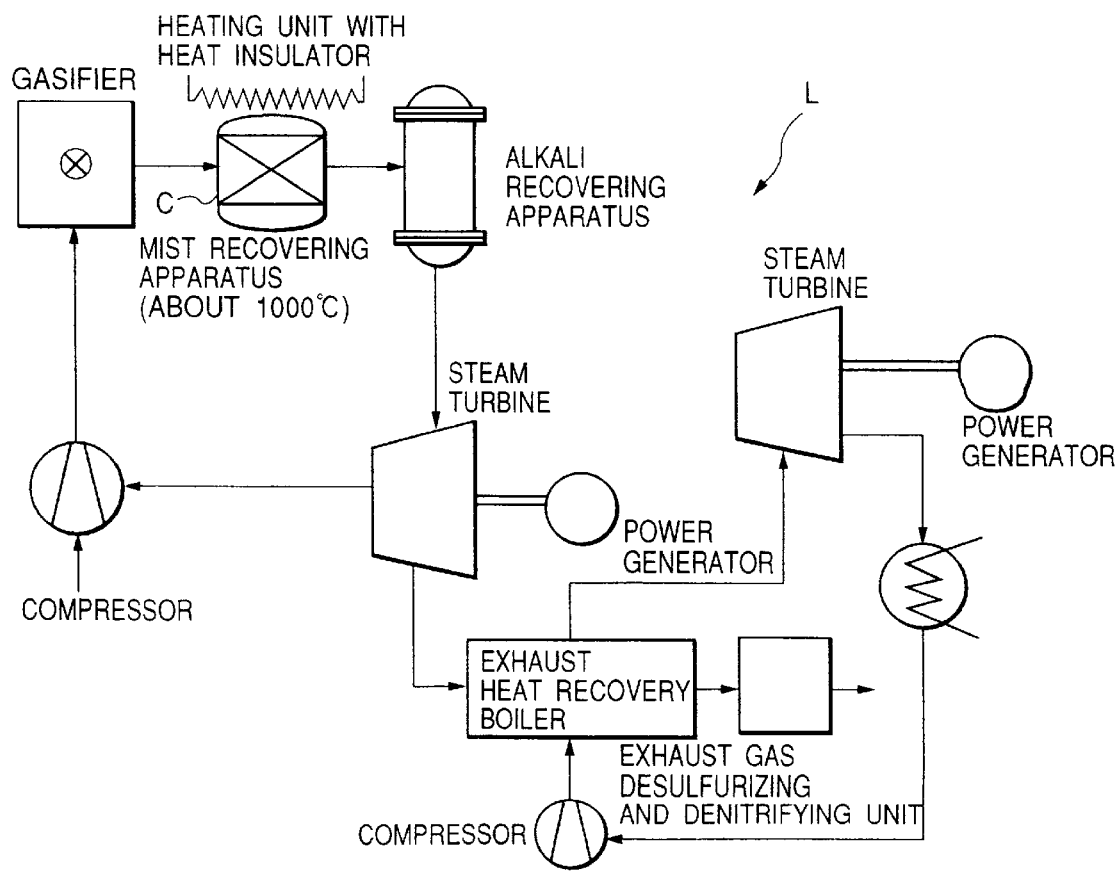
FIG. 9 is a block diagram of a coal gasification hybrid power generating system employing a mist recovering apparatus of the present invention.

The mist recovering apparatus C is applicable to the recovery of a mist in an iodine laser H as shown in FIG. 6 to remove continuously a mist contained in a gas and causing the reduction of laser output. The mist recovering apparatus C is applicable also to the recovery of a seed mist in a MHD power generating system J as shown in FIG. 7 to enhance the power generating efficiency of the MHD power generating system J. When applied to the recovery of a mist in a gas recovering system K as shown in FIG. 8 for recovering Freon gas and organochlorine solvents, the mist recovering apparatus C improves the recovery efficiency of the gas recovering system K. When applied to the recovery of a mist in a coal gasification hybrid power generating system L as shown in FIG. 9, the mist recovering apparatus C enhances the power generating efficiency of the coal gasification hybrid power generating system L. The mist recovering apparatus C of the present invention is applicable to recovering a molten salt mist or emulsion.

Figure 10:
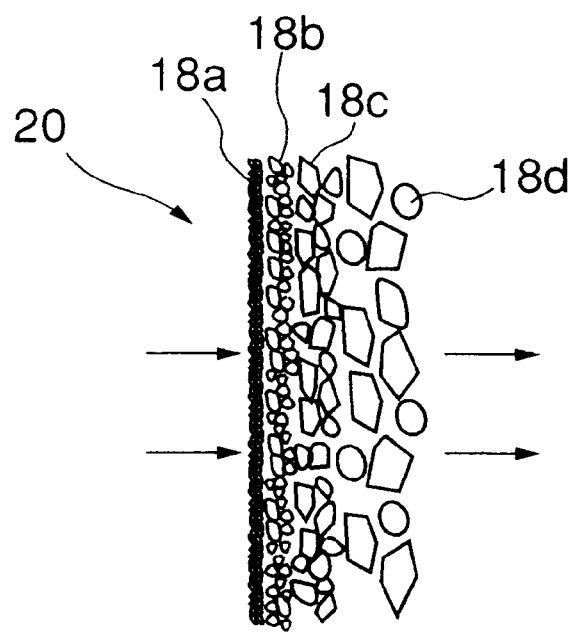
FIG. 10 is a fragmentary sectional view of another filter to be employed in a mist recovering apparatus of the present invention.
Figure 11:
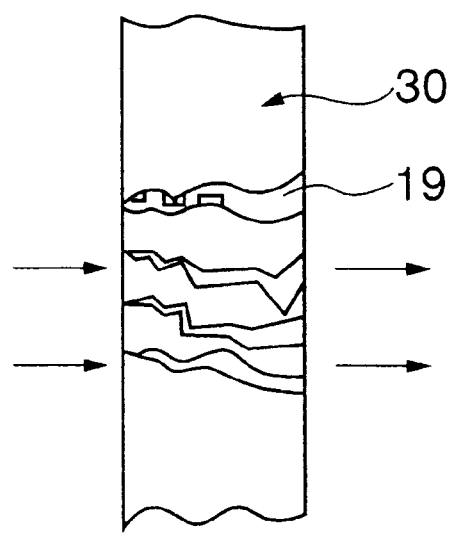
FIG. 11 is a fragmentary sectional view of third filter to be employed in a mist recovering apparatus of the present invention.

The mist recovering apparatus C may be provided with a filter structure 20 shown in FIG. 10 and formed by laminating layers of particles 18a, 18b, 18c and 18d of a metal or a resin with the particles of smaller particle sizes forming the layers nearer to the gas inlet side and the particles of greater particle sizes forming the layers nearer to the gas outlet side. As shown in FIG. 11, ceramic filter structure 30 may also be used that has pores 19 of pore size increasing from the gas inlet side toward the gas outlet side, instead of the tubular filter 10 of the sectional structure shown in FIG. 3.

Figure 12A:
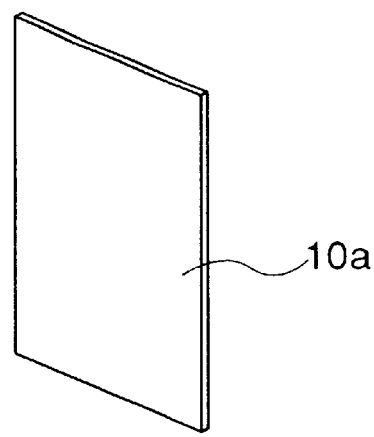
FIGS. 12(a), 12(b), 12(c) and 12(d) are perspective views of filters having the shapes of a flat plate, a corrugated plate, a hollow, truncated cone and an inclined plate, respectively.
Figure 12B:
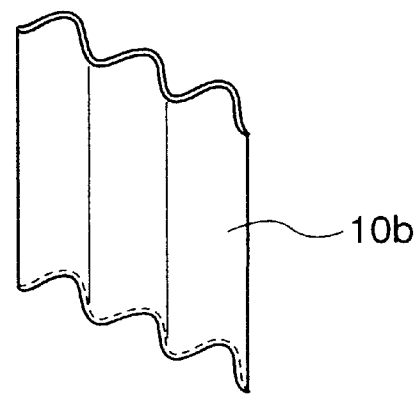
Figure 12C:
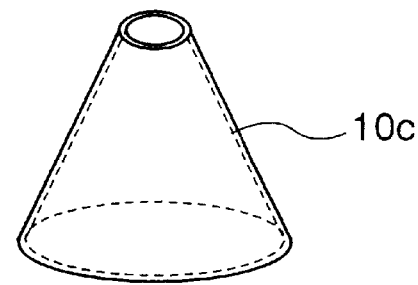
Figure 12D:
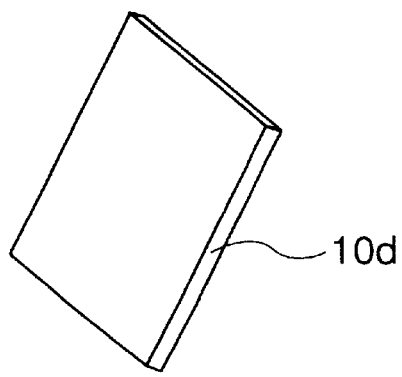
Figure 13:
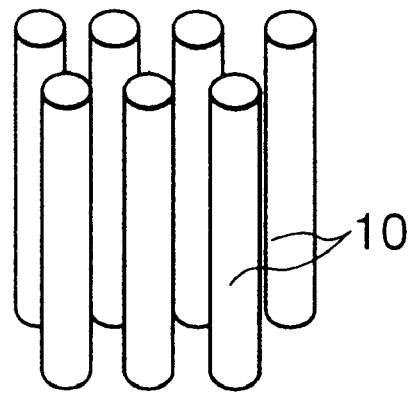
FIGS. 13(a) and 13(b) are perspective views of an arrangement of a plurality of tubular filters and an arrangement of a planar filter, respectively.
Figure 13:
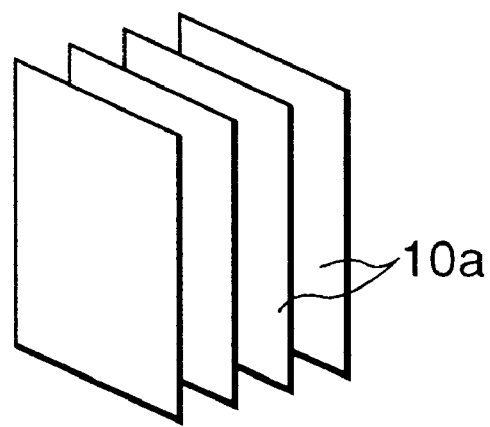

The mist recovering apparatus C may be provided with a flat filter 10a as shown in FIG. 12(a), a corrugated filter 10b as shown in FIG. 12(b), a filter 10c of the shape of a hollow truncated cone as shown in FIG. 12(c) or an inclined flat filter 10d as shown in FIG. 12(d). The mist recovering apparatus C may be provided, if necessary, with a plurality of filters each of the type of any one of the foregoing filters as shown in FIG. 13(a) or 13(b).

Figure 14:
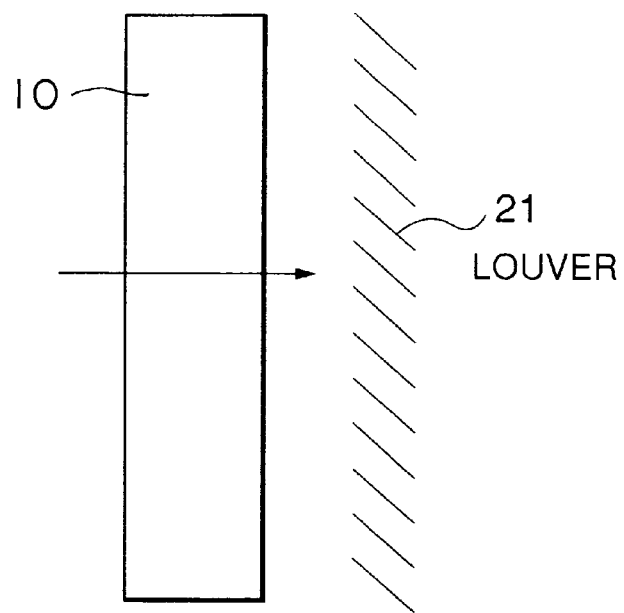
FIGS. 14(a) and 14(b) are schematic side views of a filter and a louver disposed on the gas outlet side of the filter, and a filter and a baffle disposed on the gas outlet side the filter, respectively.
Figure 14:
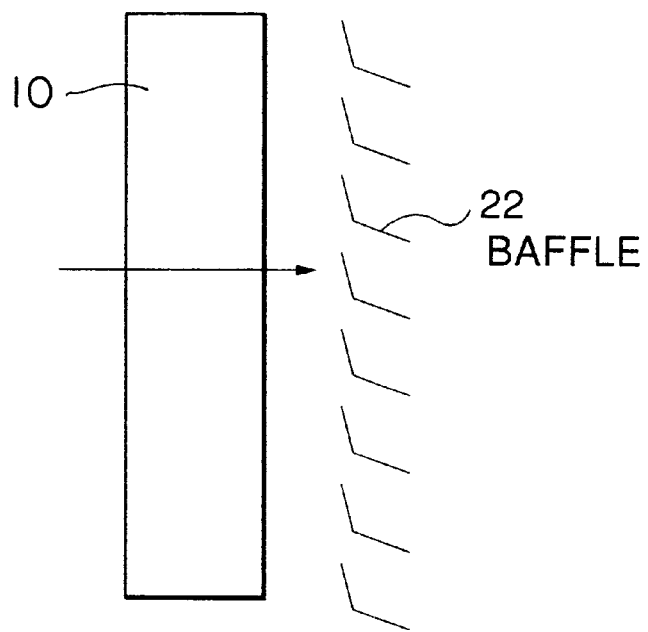

A louver 21 as shown in FIG. 14(a) or a baffle 22 as shown in FIG. 14(b) may be disposed on the gas outlet side of the filter of the mist recovering apparatus C for the further enhancement of the mist recovering efficiency of the mist recovering apparatus.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A mist recovering apparatus for recovering a mist contained in a gas, comprising:

a filter made of a lamination of at least five metal wire nets and having a gas inlet surface and an opposite gas outlet surface, said wire nets having pores formed by wires, respectively, and assembled in a face-to-face lamination with the pores disposed in mutually adjoining and communicating relation, said pores of one wire net having a greater pore size than an adjoining wire net with respect to a direction from said gas inlet surface to said gas outlet surface, said pores being gradually and continually enlarged in pore size in said direction so that the pores have largest sizes in said outlet surface, said filter being disposed with said gas inlet surface and said gas outlet surface extending substantially vertically;

means for causing a gas containing a mist to flow through said gas inlet surface, said pores and said gas outlet surface;

whereby the mist in the gas flow grows into liquid droplets in the pores as the mist is forced to flow through the pores, the largest sizes of the pores being such as to cause the droplets, which have reached the gas outlet surface, to grow to a size to drip by gravity; and draining means disposed below said gas outlet surface to receive the droplets which have dripped down along the gas outlet surface, the draining means having a draining pipe.

2. The mist recovering apparatus according to claim 1, wherein the filter has a shape of a circular tube.

3. The mist recovering apparatus according to claim 1, wherein the filter has a shape of a flat plate.

4. The mist recovering apparatus according to claim 1, wherein the filter has a shape of a corrugated plate.

5. The mist recovering apparatus according to claim 1, wherein the filter has a shape of a hollow truncated cone.

6. The mist recovering apparatus according to claim 1, further comprising a louver disposed on the gas outlet side of the filter.

7. The mist recovering apparatus according to claim 1, further comprising a baffle disposed on the gas outlet side of the filter.

8. The mist recovering apparatus according to claim 1, wherein the wire nets are made of a sintered metal.

\* \* \* \* \*